United States Patent [19]
Kasugai et al.

[11] 3,933,578
[45] Jan. 20, 1976

[54] METHOD OF RECOVERING PRESSURE SENSITIVE COPYING PAPER WASTE PAPER

[75] Inventors: Tsuneo Kasugai; Makoto Shimizu; Shinichiro Ohara, all of Fujinomiya, Japan

[73] Assignee: Fuji Photo Film Co., Ltd., Minami-ashigara, Japan

[22] Filed: May 30, 1974

[21] Appl. No.: 474,634

[30] Foreign Application Priority Data
May 30, 1973  Japan.................................. 48-60457

[52] U.S. Cl.......................................... 162/5; 162/8
[51] Int. Cl.²........................................... D21C 5/02
[58] Field of Search............................. 162/5, 8, 162

[56] References Cited
UNITED STATES PATENTS

| | | | |
|---|---|---|---|
| 3,072,521 | 1/1963 | Samuelson et al...................... | 162/5 |
| 3,179,555 | 4/1965 | Krodel................................... | 162/5 |
| 3,330,722 | 7/1967 | Amano et al......................... | 162/162 |
| 3,354,026 | 11/1967 | Illingworth............................ | 162/5 |
| 3,377,234 | 4/1968 | Illingworth............................ | 162/5 |

OTHER PUBLICATIONS

"Abstract Bulletin of Institute of Paper Chemistry," Vol. 40, No. 3, Sept., 1969, Abstracts 388, 2150.

*Primary Examiner*—S. Leon Bashore
*Assistant Examiner*—William F. Smith
*Attorney, Agent, or Firm*—Sughrue, Rothwell, Mion, Zinn & Macpeak

[57] ABSTRACT

A method of recovering waste paper of a pressure sensitive copying paper which comprises, in the defibration processing for regenerating the waste paper, using an alkaline solution containing a surface active agent. This method provides a white pulp which is hardly stained.

6 Claims, No Drawings

METHOD OF RECOVERING PRESSURE SENSITIVE COPYING PAPER WASTE PAPER

BACKGROUND OF THE INVENTION

1. FIELD OF THE INVENTION

This invention relates to a method of recovering waste paper and, specifically, to a method of producing a recovered pulp which is stained to only a slight extent and has an excellent brightness by subjecting waste paper of a pressure sensitive copying paper to defibration processing with an alkaline solution containing a surface active agent.

2. DESCRIPTION OF THE PRIOR ART

Pressure sensitive copying papers usually include those papers comprising an upper paper having micro capsules containing an electron donative color former dissolved in an organic solvent applied on the surface of the sheet, a lower paper with an electron attractive clay applied on the surface of the sheet and an intermediate paper having capsules containing a color former applied to one surface of the sheet and having a clay applied to the other surface of the sheet, or those having micro capsules and a clay applied on the same side of the sheet. Such pressure sensitive copying papers are described in, for example, U.S. Pat. Nos. 2,505,470; 2,505,489; 2,550,471; 2,548,366; 2,712,507; 2,730,456; 2,730,457; 2,939,009; 3,427,180; 3,455,721; 3,516,845; 3,634,121; and 3,672,935; German OLS No. 1,939,624; or in A. Kondo, Microcapsule, Nikkan Kogyo Shimbun Co., Tokyo 1970.

In using pressure sensitive papers by the combination of an upper paper and a lower paper or by the combination of an upper paper, an intermediate paper or papers and a lower paper, when pressure is locally applied to a capsule-containing layer and a clay-containing layer in contact with each other, the capsules in the pressurized area are ruptured and a color is produced by the reaction of the color former and the clay. Also, a color is produced by the application of a localized pressure to a pressure sensitive paper having capsules and a clay on the same side of the sheet.

Various types of conventional defibrating machines for regenerating waste paper such as a pulper, a beater, a high-speed defibrating machine, a disc refiner or a conical refiner are known, and they are used alone or in combination. Usual waste paper can be easily defibrated in these defibrating machines, but auxiliaries are required for a waste paper which is relatively difficult to defibrate such as a wet-proof paper. Various alkaline chemicals and aluminum sulfate and the like are often used as auxiliaries.

When waste paper is defibrated using the conventional method, capsules are destroyed during the defibration because of the mechanical grinding action exerted on them, and the exposed color former and clay react to product color. Therefore, the color occurs in the pulp recovered according to the conventional method and the pulp is remarkably stained. Such a pulp can not be used as a raw material for high quality paper and only a part of the pulp has been used exclusively as a raw material for low quality paper.

SUMMARY OF THE INVENTION

The production of a pulp from recovery of waste paper from pressure sensitive copying papers and which is suitable for a raw material for high quality paper by inhibiting the color production during the defibration has been studied and, as the result, recovery of a pulp which is not stained by defibrating with an alkaline solution adjusted to a pH of greater than 7.5 and containing an surface active agent to inhibit the color production has been accomplished.

DETAILED DESCRIPTION OF THE INVENTION

The alkaline compounds which can be used in this invention can be organic bases such as sodium oxalate, sodium acetate, potassium acetate, potassium oxalate, etc., or inorganic bases such as sodium hydroxide, potassium hydroxide, etc. Particularly preferred is sodium hydroxide and potassium hydroxide since a high pH is obtained even when they are used in a small amount.

The surface active agents which can be used in this invention can be anionic surface active agents such as the salts of aliphatic acids, the salts of higher alcohol sulfates, the salts of aliphatic alcohol phosphates or the salts of alkyl aryl sulfonic acids, cationic surface active agents such as the salts of aliphatic amine or quaternary ammonium salts, or nonionic surface active agents such as the polyoxyethylene alkyl ethers, the polyoxyethylene alkyl phenol ethers or sorbitan alkyl esters. These surface active agents are disclosed, for example, in U.S. Pat. Nos. 2,240,472; 2,271,623; 2,288,226; 2,311,021; 2,322,027; 2,360,289; 2,533,514; 2,600,831; 2,739,891; 2,801,170; 1,823,123; 2,831,766; 2,852,382; 2,949,360; 3,068,101; 3,133,816; 3,158,484; 3,201,253; 3,210,191; 3,294,540; 3,396,027; 3,415,649; 3,441,413; 3,442,654; 3,475,174; 3,545,974; 3,619,195 and 3,775,349; and British Pat. Nos. 1,002,878; 1,077,317 and 1,198,450. Preferably, cationic surface active agents or nonionic surface active agents are used.

The effect of the surface active agent remarkably depends on the temperature and concentration used in the defibration processing, and the type of waste paper. The amount of the surface active agent which can be used is not limited to any particular range and depends on the type of surface active agent employed and the processing conditions used. Although the temperature during the defibration depends on the structure of a defibrating machine and the concentration and type of waste paper, temperatures generally higher than room temperature are employed, e.g., about 20° to 100°C, more generally 40° to 100°C. The concentration during the defibration depends on the structure of a defibrating machine, and it can be selected, without limitation, adapted to the particular defibrating machine.

It will be also apparent that the amount of the surface active agent added can be greatly changed depending on the desired brightness of the recovered pulp and the capacity of a defibrating machine.

The pH of the system generally ranges from about 7.5 to about 13.5, and preferably about 9 to about 11, particularly for ease of handling.

The surface active agent can be used in amounts of about 0.01 to about 20% by weight, for example, 0.5 to 5% by weight based on the weight of the waste paper.

The amount of the charged waste paper relative to the processing solution can be appropriately changed depending on the type of waste paper being treated. For example, the paper can be added in amounts of about 0.1 to 10 kg per 10 l of the processing solution.

This invention is applicable to waste pressure sensitive copying papers utilizing color forming materials such as triphenyl methane compounds, thiazine compounds, spiropyran compounds, xanthene compounds, etc., which react with acid compounds such as clays to form a color.

The invention will be described in greater detail by reference to the following examples. Unless otherwise indicated, all parts, percents, ratios and the like are by weight.

EXAMPLE 1

Into a TAPPI type test pulper, 90 g (dry weight) of waste paper of commercially available pressure sensitive copying paper (intermediate paper with a 50 g/m² basis weight and of the blue black color-producing type containing a mixture of fluorane compounds) was charged together with 1500 ml of a 0.05% aqueous solution of sodium hydroxide heated to 50°C. Further, each of a cationic surface active agent, Catiogen L (an alkyl trimethyl ammonium chloride, produced by Dai-ichi Kogyo Seiyaku Co., Ltd.), an anionic surface active agent, P Soap (a stearic acid sodium salt, produced by Nippon Oil and Fats, Co., Ltd.) and a nonionic surface active agent, Epan 750 (a polyethylene glycol ether, produced by Dai-ichi Kogyo Seiyaku Co., Ltd.) was respectively added in a concentration of 0.83% based on the weight of the loss paper, and then defibration was effected. For comparison, the waste paper was also defibrated according to the conventional method. That is, the waste paper was defibrated with hot water containing a 0.05% solution of aluminum sulfate or a 0.05% solution of sodium hydroxide, or hot water without any auxiliary. The brightness of the defibrated material was evaluated as the brightness of a hand-made paper obtained therefrom. The handmade paper with a 40 g/m² basis weight was prepared from the paper material, which has been completely defibrated, according to JIS P-8209 (Method of Preparing Hand Made Paper for Pulp Test). The reflectance of each of the handmade paper at a wavelength of 440 mμ and 560 mμ was measured using a spectrophotometer. Moreover, the brightness was evaluated visually. The results obtained are shown in Table 1.

White pulp which was stained to only a slight extent was obtained by defibration with an alkaline solution containing a surface active agent according to the method of this invention.

TABLE 1

|  |  | Sample No. | | | | | |
|---|---|---|---|---|---|---|---|
|  |  | 1 | 2 | 3 | 4 | 5 | 6 |
| Amount of waste paper charged (dry weight) | (g) | 90 | 90 | 90 | 90 | 90 | 90 |
| Amount of water used | (g) | 1500 | 1500 | 1500 | 1500 | 1500 | 1500 |
| Amount of sodium hydroxide added | (g) | 0 | 0 | 0.75 | 0.75 | 0.75 | 0.75 |
| Amount of aluminum sulfate added | (g) | 0 | 0.75 | 0 | 0 | 0 | 0 |
| Surface active agent used |  | — | — | — | Catiogen L | P Soap | Epan 750 |
| Amount of surface active agent added | (g) | 0 | 0 | 0 | 0.75 | 0.75 | 0.75 |
| Maximum temperature during processing in pulper | (°C) | 50 | 52 | 49 | 51 | 51 | 50 |
| pH of paper slurry after adding processing chemicals |  | 6.9 | 4.0 | 10.7 | 10.8 | 10.9 | 10.7 |
| Defibration time | (min) | 30 | 30 | 30 | 30 | 30 | 30 |
| Reflectance of sheet at 440 mμ | (%) | 69.2 | 66.2 | 70.2 | 75.2 | 73.5 | 79.4 |
| Reflectance of sheet at 560 mμ | (%) | 64.8 | 61.3 | 67.1 | 73.6 | 70.7 | 74.8 |
| Brightness by visual judgement* |  | 3 | 1 | 4 | 8 | 7 | 8 |

*For brightness by visual judgement, the higher the number the higher the brightness.

EXAMPLE 2

Into a small-sized Hydra test pulper, 2.2 kg (dry weight) of a waste paper of commercially available pressure sensitive paper (intermediate paper with a 90 g/m² basis weight and of a blue black color-producing type) was charged together with 40 l of water at 15°C. A cationic surface active agent, Catiogen L (produced by Dai-ichi Kogyo Seiyaku Co., Ltd.) was added in a concentration of 3.18% based on the weight of the waste paper. Aluminum sulfate or potassium hydroxide was added to adjust the system to a predetermined pH and then defibration was effected. For comparison, the waste paper was defibrated according to the conventional method. That is, the waste paper was defibrated with hot water without any auxiliary. The brightness of the defibrated paper material was evaluated in the same way as described in Example 1. The results obtained are shown in Table 2.

The process of this invention provides a white pulp which is stained only to a slight extent.

TABLE 2

|  |  | Sample No. | | | | | |
|---|---|---|---|---|---|---|---|
|  |  | 1 | 2 | 3 | 4 | 5 | 6 |
| Amount of waste paper charged (dry weight) (kg) | (g) | 2.2 | 2.2 | 2.2 | 2.2 | 2.2 | 2.2 |
| Amount of water used liter | (g) | 40 | 40 | 40 | 40 | 40 | 40 |
| Amount of potassium hydroxide added | (g) | 0 | 0 | 0 | 4 | 12 | 200 |
| Amount of aluminum sulfate added | (g) | 0 | 70 | 0 | 0 | 0 | 0 |
| Surface active agent used |  | — | Catiogen L | Catiogen L | Catiogen L | Catiogen L | Catiogen L |
| Amount of surface active agent added | (g) | 0 | 70 | 70 | 70 | 70 | 70 |
| Maximum temperature during |  | 50 | 48 | 49 | 50 | 49 | 50 |

TABLE 2-continued

|  |  | Sample No |  |  |  |  |  |
|---|---|---|---|---|---|---|---|
|  |  | 1 | 2 | 3 | 4 | 5 | 6 |
| processing in pulper | (°C) |  |  |  |  |  |  |
| pH of paper slurry after adding processing chemicals |  | 6.9 | 4.2 | 7.3 | 8.3 | 10.4 | 12.7 |
| Defibration time | (min) | 50 | 50 | 50 | 50 | 50 | 50 |
| Reflectance of sheet at 440 mμ | (%) | 72.2 | 74.3 | 76.4 | 76.0 | 76.4 | 78.2 |
| Reflectance of sheet at 560 mμ | (%) | 65.7 | 68.3 | 70.6 | 71.5 | 72.1 | 78.5 |
| Brightness by visual judgement* |  | 3 | 4 | 5 | 7 | 8 | 10 |

*As described in Example 1.

While the invention has been described in detail and with reference to specific embodiments thereof, it will be apparent to one skilled in the art that various changes and modifications can be made therein without departing from the spirit and scope thereof.

What is claimed is:

1. In a method of recovering waste, pressure sensitive copying paper, which includes a paper having micro capsules containing an electron donative color former dissolved in an organic solvent and a paper with an electron attractive clay, including difibration processing for regenerating said waste paper, the improvement comprising: defibrating said paper in an aqueous alkaline solution of pH greater than 7.5, said aqueous alkaline solution containing a surface active agent in an amount of 0.01% to 20% by weight based on the weight of the waste paper to form a pulp, wherein color production in the pulp during defibration is inhibited.

2. The method of claim 1 wherein said surface active agent is a cationic or nonionic surface active agent.

3. The method of claim 1, wherein said surface active agent is an anionic surface active agent, a cationic surface active agent, or a nonionic surface active agent.

4. The method of claim 3, wherein said anionic surface active agent is a salt of an aliphatic acid, a salt of a higher alcohol sulfate, a salt of an aliphatic alcohol phosphate, or a salt of an alkyl aryl sulfonic acid, wherein said cationic surface active agent is a salt of an aliphatic amine or a quaternary ammonium salt, and wherein said nonionic surface active agent is a polyoxyethylene alkyl ether, a polyoxyethylene alkyl phenol ether or a sorbitan alkyl ester.

5. The method of claim 1, wherein said alkaline solution has a pH ranging from about 7.5 to about 13.5.

6. The method of claim 5, wherein said waste paper is present in an amount of about 0.1 to 10 kg per 10 liters of the alkaline solution.

* * * * *